United States Patent
Spangler et al.

(10) Patent No.: US 8,386,763 B1
(45) Date of Patent: Feb. 26, 2013

(54) SYSTEM AND METHOD FOR LOCKING DOWN A CAPABILITY OF A COMPUTER SYSTEM

(75) Inventors: Randall R. Spangler, San Jose, CA (US); William F. Richardson, Santa Clara, CA (US); Sumit Gwalani, Sunnyvale, CA (US); Luigi Semenzato, Oakland, CA (US); William A. Drewry, Nashville, TN (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/343,677

(22) Filed: Jan. 4, 2012

(51) Int. Cl.
*H04L 29/14* (2006.01)
*G06F 15/177* (2006.01)

(52) U.S. Cl. ............ 713/2; 713/1; 713/100; 713/151; 713/193; 713/194

(58) Field of Classification Search .......... 713/1, 2, 713/100, 151, 193, 194
See application file for complete search history.

(56) References Cited

U.S. PATENT DOCUMENTS

| | | | | |
|---|---|---|---|---|
| 5,937,063 A * | 8/1999 | Davis | | 713/187 |
| 6,711,675 B1 * | 3/2004 | Spiegel et al. | | 713/2 |
| 6,804,781 B1 * | 10/2004 | Castro | | 713/193 |
| 7,237,126 B2 * | 6/2007 | Neufeld | | 713/194 |
| 7,343,493 B2 * | 3/2008 | Challener et al. | | 713/193 |
| 7,447,894 B2 * | 11/2008 | Oshiba et al. | | 713/2 |
| 7,467,417 B2 * | 12/2008 | Stillerman et al. | | 726/30 |
| 7,506,381 B2 * | 3/2009 | Sormunen et al. | | 726/30 |
| 7,607,025 B1 * | 10/2009 | Trimberger | | 713/193 |
| 7,660,977 B2 * | 2/2010 | Zimmer et al. | | 713/1 |
| 7,865,740 B2 * | 1/2011 | Rudelic et al. | | 713/193 |
| 2007/0074048 A1 * | 3/2007 | Rudelic et al. | | 713/193 |
| 2009/0037743 A1 * | 2/2009 | Narayanaswami | | 713/186 |
| 2009/0106543 A1 * | 4/2009 | Pekny | | 713/2 |
| 2010/0031349 A1 * | 2/2010 | Bingham | | 726/20 |
| 2010/0266132 A1 * | 10/2010 | Bablani et al. | | 380/286 |

OTHER PUBLICATIONS

"Verified Boot Data Structures," The Chromium Projects, Sep. 10, 2010, <http://www.chromium.org/chromium-os/chromiumos-design-docs/verified-boot-data-structures>.

* cited by examiner

*Primary Examiner* — Kim Huynh
*Assistant Examiner* — Zahid Choudhury
(74) *Attorney, Agent, or Firm* — McDermott Will & Emery LLP

(57) ABSTRACT

A system and method is disclosed for locking down a capability of a computer system. Hardware instructions initiate a sequence of boot cycles to launch a computer operating system on a computer-enabled device. During the boot cycles, multiple levels of boot code are verified. Each verified stage of boot code verifies a subsequent stage of boot code. If the subsequent stage of boot code cannot be verified, the verified stage locks a capability of the computer so that the subsequent stage of boot code cannot modify the capability.

25 Claims, 4 Drawing Sheets

United States Patent US 8,386,763 B1

SYSTEM AND METHOD FOR LOCKING DOWN A CAPABILITY OF A COMPUTER SYSTEM

TECHNICAL FIELD

The subject technology relates generally to computer operating systems and firmware, namely initializing hardware and software during a boot sequence.

BACKGROUND

Modern computer-enabled devices may include various initialization mechanisms. Generally, a sequence of boot stages executes in a boot path to initialize the hardware components of a device and load an operating system for use by a user. To add or remove hardware or software functionality, some portions of the boot sequence may be modified and/or supplied by parties other than the provider of the operating system. A modified boot stage inserted into the boot path may cause the system to be used in a manner not intended by its original manufacturer or provider.

SUMMARY

The subject technology provides a device and method for locking down a capability of a computer system. According to one aspect, a computing device may include a processor, one or more storage media containing multiple stages of boot code, including a principal stage of boot code, and a firmware memory. The firmware may include initiation software for initiating a boot up of the computing device that, when executed by the processor, causes the processor to execute the principal stage of boot code, and lock a capability of the computing device so that a subsequent stage of boot code cannot modify the capability.

In another aspect, a machine-readable medium may include machine-executable instructions stored thereon, which when executed by a computing device cause a computing device to perform a method of locking a capability of a computer system. In this regard, the method may include initiating a sequence of boot stages, each boot stage loading a stage of boot code from a storage medium, confirming that a principal stage of boot code is verified, and locking a capability of the computing device so that the subsequent stage of boot code cannot modify the capability. The method may further include executing the principal stage of boot code, verifying a subsequent stage of boot code, and locking the capability if the subsequent stage of boot code cannot be verified.

In a further aspect, a computer-implemented method may include executing a verified stage of boot code on the computer-enabled device to set a capability of the computer-enabled device to a default state, verifying a subsequent stage of boot code, and, if the subsequent stage of boot code cannot be verified, preventing the subsequent stage of boot code from modifying the state of the capability It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
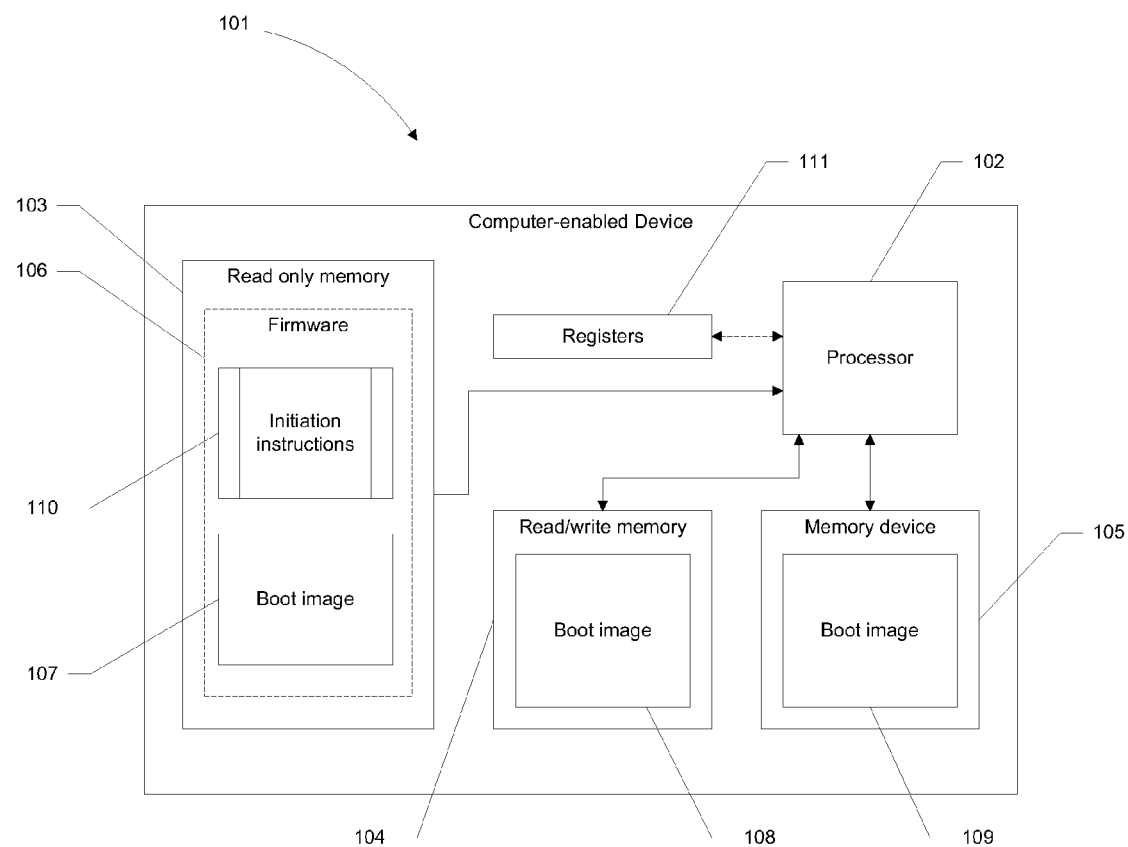
FIG. 1 is a diagram of an apparatus and system for initiating a boot sequence according to one aspect of the subject technology.

FIG. 1 is a diagram of an apparatus and system for initiating a boot sequence according to one aspect of the subject technology. A computer-enabled device 101 may include a processor 102, a read-only memory 103, a read/write memory 104, and a storage device 105 (for example, hard drive, removable flash memory card, USB flash drive, or the like). Device 101 may be configured to startup operations using one or more boot images spanning firmware, kernel partitions, and/or a root file system of an operating system, with each boot image including multiple levels of boot code. In some aspects, the boot images may be stored on one or more corresponding storage media. For example, firmware 106 on read-only memory 103 may include a principal boot image 107 (for example, an initial or verified stage of boot code), and read/write memory 104 may include a second boot image 108, and storage device 105 (for example, a hard drive) may include a third boot image 109 (for example, a kernel image).

Firmware 106 may also include initiation instructions 110 that, when executed by the processor 102, are operable to cause the processor to initiate a boot sequence and to load and execute one or more of the previously described boot images. In some aspects, instructions 110 may cause device 101 to perform a verification of a boot image. For example, as device 101 is booted, a cryptographic key may be used to verify the boot image, or a portion of the boot image. In this regard, device 101 may perform a checksum at each stage in a boot sequence up from a core trusted (for example, known, unmodified, and/or verified) piece of boot code, and, if a stage cannot be verified, prevent the unverified stage from enabling or disabling certain hardware or software capabilities of device 101.

In some aspects, device 101 may include one or more hardware registers 111. Hardware register 111 may include a set of capability bits for controlling hardware and/or system level features of the device, such as clearing memory, enabling/disabling a device (for example, network card or 3G/4G modem, HDMI output), and the like. Hardware registers 111 may be implemented as one or more memory addresses of read/write memory 104, included as part of processor 102 or an integrated circuit on a system board associated with processor 102. In other aspects, hardware registers 111 may be software addressable, wherein low level software modules may be configured to access hardware registers 111 to enable/disable certain features of device 101. Such software modules may include and expose capability bits (for example, as a bit mask) to other modules for easy configuration of registers 111 via the capability bits. A capability bit may also be implemented as a circuit, which is set (for example, locked) into one of a plurality of states by sending a sequence of general purpose input/output (GPIO) outputs from processor 102 to specific hardware components. For example, a "developer" or "verified" LED may be turned on or off, or power controlled to one or more system components.

Figure 2:
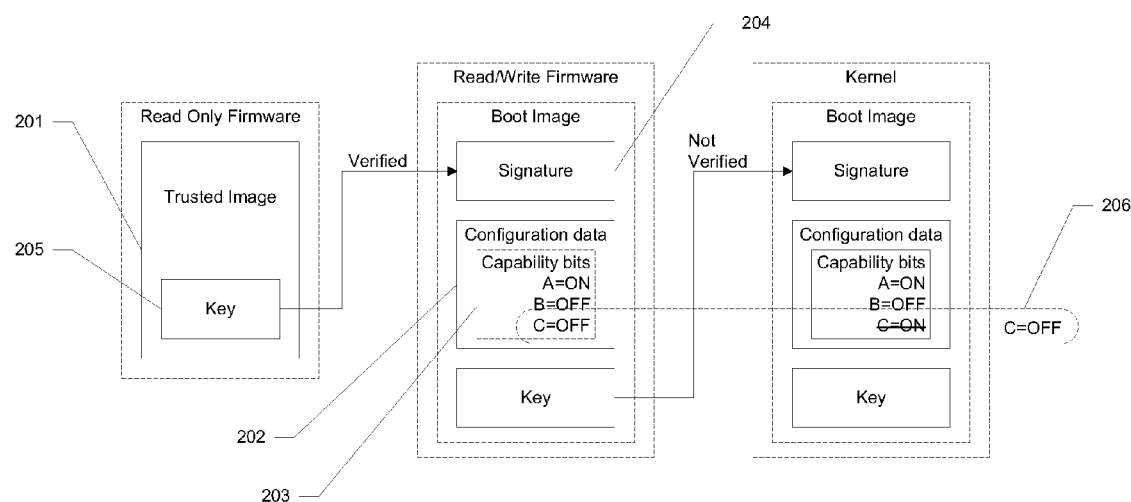
FIG. 2 is a diagram of a boot sequence of a computer-enabled device according to one aspect of the subject technology.

FIG. 2 is a diagram of a boot sequence of a computer-enabled device according to one aspect of the subject technology. A boot sequence may initiate from a trusted image 201 (for example, principal boot image 107, an image at a root level of trust, verified image, known image, or the like). In one example, trusted image 201 may be a trusted part of a computer-enabled device 101 (for example, part of firmware 106 stored on read-only memory 103, in a BIOS, a lockable memory, or the like) that is responsible for ensuring the security of all other parts of the system. As will be described in further detail, trusted image 201 may also be defined as a verified stage of boot code, or verified image.

After, or concurrently with, executing the features of a principal stage of software (for example, trusted image 201), the principal stage and/or code responsible for the boot sequence (for example, initiation instructions 110) may perform a verification of the next stage prior to executing it. Each stage of code may include, as part of its veracity metadata, a set of configuration data 202 responsible for setting one or more capability bits 203. As described previously, capability bits 203 may be used to control hardware and/or system level features of device 101 via a hardware register 111. In another aspect, capability bits may be included as part of a software program for controlling certain features of the software program or the device via the software program. Configuration data 202 may, for example, include commands that set capability bits 203 to enable or disable these features.

Each stage in the boot sequence may have access to and/or have the ability to set or modify the status of the capability bits (for example, via configuration data 202). According to one aspect, a verified stage may lock one or more capabilities of device 101 so that a subsequent stage of boot code cannot modify the capability. In this regard, locking down a capability of device 101 may include preventing a subsequent stage from setting or changing capability bits. Locking a software capability may include device 101 designating an executable portion of code loaded by the current or prior verified boot code and locking it so that it cannot be replaced or altered by a later stage of boot code. In further examples, locking a software capability may include reassigning a memory address associated with the capability (for example, an address of registers 111) to a different memory address. Locking a capability may include performing a software patch of a following stage of boot code. Software may also be locked down by marking it as non-executable in a software or hardware component responsible for handling accesses to memory requested by processor 102 (for example, a memory management unit of processor 102), marking it as non-readable in the storage device on which it is stored, or the like. If the software is encrypted, it may be locked by erasing (for example, automatically erasing) from memory an associated decryption key before the software is decrypted. Device 101 or a principal stage of boot code may be configured to, on loading of software (for example, a subsequent stage of boot code), determine (for example, read) one or more capabilities of the software (for example, by reading the capability bits), and then lock or unlock features of the loaded software selected based on the determined capabilities and, for example, locking instructions stored in a lookup table indexed by capability.

In another aspect, one or more stages of boot code and/or configuration data 202 may be signed with a signature 204 (for example, a secure hash). Device 101 may be configured such that signature 204 of a subsequent stage of boot code must be verified (for example, trusted, unmodified, or the like) before the subsequent stage is allowed the ability to add to, or change, hardware and/or system level features of the device. Signature 204 may be verified by a current or earlier stage of boot code, by a built-in capability of a processor (for example, processor 102), a Trusted Platform Module (TPM), or the like. In some aspects, a stage of boot code may be considered to be verified if it is read-only, or stored in a read-only memory medium (for example, read-only memory 103, an EEPROM with write protection enabled, or the like). In one aspect, signature 204 may be verified by a key 205 provided by the current or earlier stage of boot code, or any of the other preceding examples.

In some aspects, a stage of boot code may be considered to be trusted enough to lock or unlock one or more capabilities of device 101 even if it cannot be verified (for example, it is a rewritable component, lacks a signature, or the like). In this regard, on a system where a stage of boot code cannot be signed or verified, or made read-only, the stage of boot code may be allowed to modify, for example, a capability header of a subsequent stage of boot code to enable or disable capabilities to the extent that modification could not be accomplished by an average user (for example, a reasonably well informed and reasonably observant and prudent consumer of computer-enabled device 101).

In one example, a subsequent unverified stage may be prevented from changing the features via the previously described capability bits. In this manner, the manufacturer and/or provider of the lower level of boot code (for example, trusted image 201) may control acceptance of what software may be installed in later parts of the boot sequence. One or more capability bits may be set to an OFF position by a verified image, and a modification restriction 206 placed on the bit by the verified stage. In the depicted example, an attempt by the unverified image to set capability bit C to the ON position is prevented by a modification restriction 206. In another example, a verified stage of boot code on the computer-enabled device may set a capability of the computer-enabled device to a default state (for example a disabled state of the capability). If a subsequent stage of boot code cannot be verified, the subsequent stage of boot code may be prevented from modifying the state of the capability.

In some aspects, each stage of the boot sequence may be stored and/or executed from a different memory location. As depicted by FIG. 2, a root level of trusted code (for example, trusted image 201) may be included in a stage of boot code stored as part of a read-only firmware on, for example, a read-only memory 103. Subsequent steps may be stored on different and/or separate devices of decreasing accessibility (for example, a second stage as firmware stored in read-write memory 104, and a third stage stored on a storage device 105). Trusted image 201 and/or subsequent stages of boot code, however, may be stored on any memory device. In one example, the stages depicted by FIG. 2 may collectively be stored on a single storage device 105 (for example, a hard drive). During a boot of device 101, initiation instructions 110 may be executed, causing device 101 to begin to load and execute each stage of boot code.

With reference to FIGS. 1 and 2, a computer-enabled device (for example, device 101) may be configured with instructions (for example, instructions 110) that, when executed, cause a processor of device (for example, processor 102) to perform a verification of a stage of boot code. For example, device 101 may load a key 204 from a current stage of boot code, and then perform a verification of a subsequent stage by performing an authentication of a signature 203 of the subsequent stage. The verification and/or authentication may take place before loading the subsequent stage, or, in some aspects, on loading or after loading the subsequent stage. On determining that the subsequent stage of boot code cannot be verified, device 101 may lock or enable/disable one or more capabilities.

In other aspects, a verified stage of boot code, when executed, may cause device 101 to perform a verification of a subsequent stage of boot code. In this regard, the verified stage may verify the signature of the following stage to confirm whether the following stage is a verified stage. If the current stage cannot confirm that the following stage is verified then the current stage may lock and/or disable/enable certain capabilities before allowing the following stage to execute. In one example, configuration data 202 of a current stage may be verified by a key 204 at a preceding stage before the current stage is allowed a capability to add to, or change, hardware or system level features of the computing device. In another example, if the subsequent stage cannot be verified, the current stage may perform a patch of the code for the following stage to lock down how that stage alters the capability bits of device 101 or the capability bits provided by the current or other stages. This may protect some capabilities that cannot be locked down at the hardware level by the already verified code.

Figure 3:
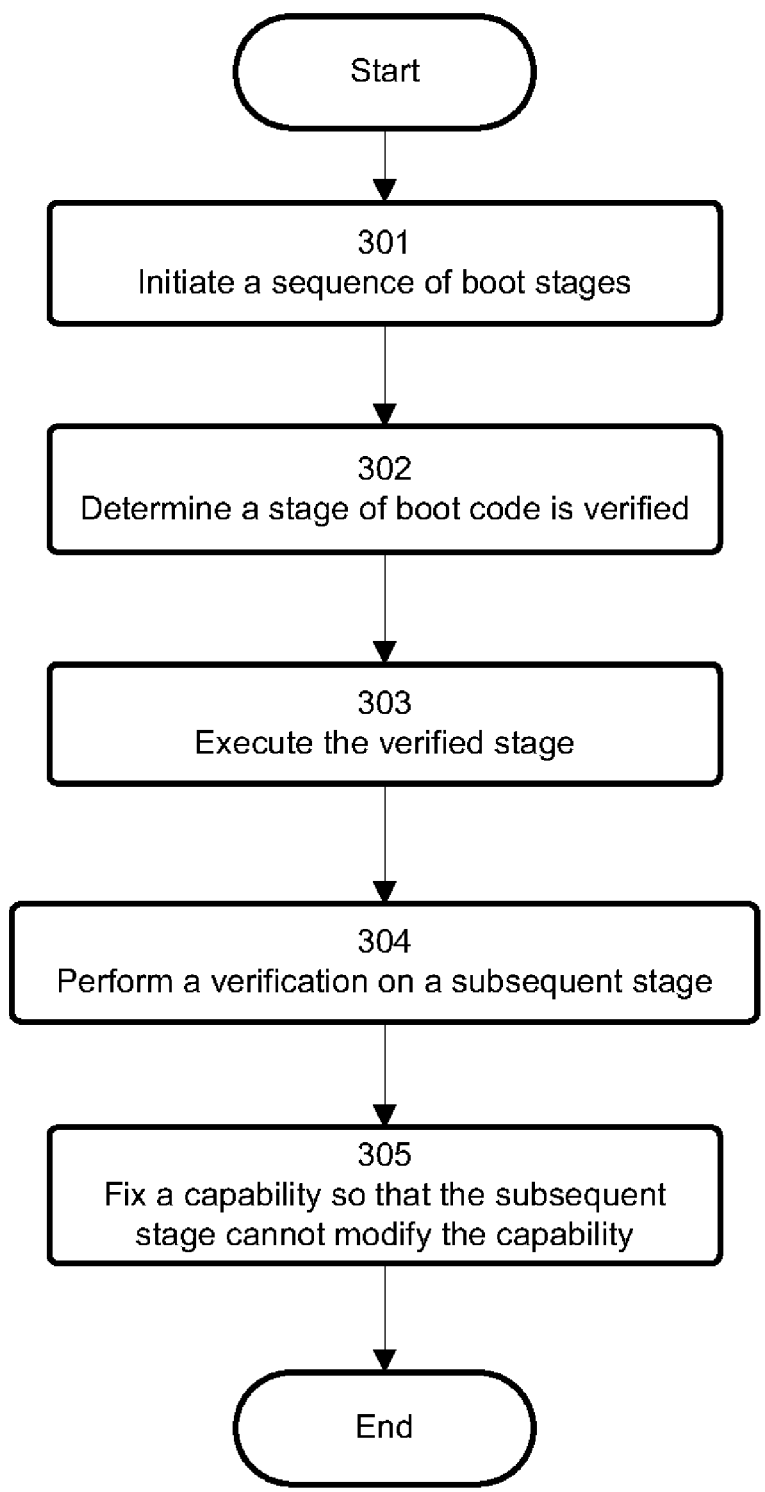
FIG. 3 is a flowchart illustrating an exemplary process for locking down a capability of a computer system according to one aspect of the subject technology.

FIG. 3 is a flowchart illustrating an exemplary process for locking down a capability of a computer system according to one aspect of the subject technology. In step 301, a computer-enabled device 101 initiates a sequence of boot stages, each stage loading a stage of boot code from a storage medium. In step 302, device 101 determines that a stage of boot code is verified, and, in step 303, executes the verified stage of boot code. In step 304, device 101 performs a verification on a subsequent stage of boot code, and, in step 304, if the subsequent stage of boot code cannot be verified, fixes (for example, locks) a capability of the computing device so that the subsequent stage of boot code cannot modify the capability.

Figure 4:
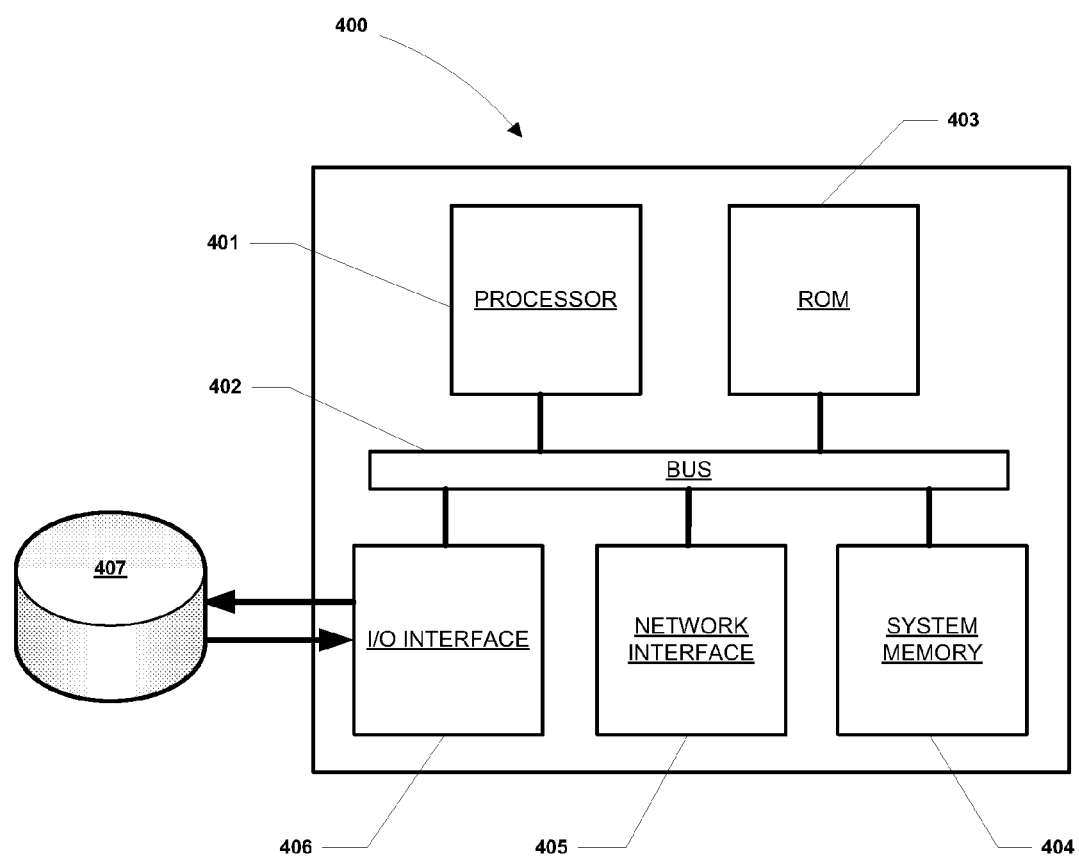
FIG. 4 is a diagram illustrating an exemplary server system for initiating a boot sequence, including a processor and other internal components, according to one aspect of the subject technology.

FIG. 4 is a diagram illustrating an exemplary computer-enabled system for initiating a boot sequence, including a processor and other internal components, according to one aspect of the subject technology. In some aspects, a computerized device 400 (for example, computer-enabled device 101 or the like) includes several internal components such as a processor 401, a system bus 402, read-only memory 403, system memory 404, network interface 405, I/O interface 406, and the like. In one aspect, processor 401 may also be communicating with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 504. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computing device, comprising:
   a processor;
   one or more storage media containing multiple stages of boot code, including a principal stage of boot code; and
   a firmware memory including initiation software for initiating a boot up of the computing device that, when executed by the processor, causes the processor to:
   execute the principal stage of boot code;
   verify a subsequent stage of boot code, the subsequent stage of boot code including a set of configuration data;
   verify a signature associated with the set of configuration data using a key of the principal stage;
   on determining that the subsequent stage of boot code cannot be verified, lock a capability of the computing device so that the subsequent stage of boot code cannot modify the capability, wherein locking the capability includes preventing the subsequent stage from modifying hardware or system level features of the computing device; and
   execute the subsequent stage of boot code.

2. The computing device of claim 1, wherein the principal stage of boot code is a verified stage of boot code.

3. The computing device of claim 1, wherein the initiation software, when executed by the processor, further causes the processor to:
   execute the principal stage of boot code to verify the subsequent stage of boot code.

4. The computing device of claim 1, wherein the capability of the computing device is a hardware capability.

5. The computing device of claim 1, wherein the capability of the computing device is a software capability.

6. The computing device of claim 5, wherein locking the software capability includes identifying and locking an executable portion of code so that the executable portion of code cannot be replaced or altered by a later stage of boot code.

7. The computing device of claim 1, wherein locking the capability includes reassigning a memory address associated with the capability to a different memory address.

8. The computing device of claim 1, wherein locking the capability includes marking a software component responsible for the capability as non-executable or non-readable.

9. The computing device of claim 1, wherein locking the capability includes erasing from memory a decryption key associated with an encrypted software component responsible for the capability before the encrypted software component is decrypted.

10. The computing device of claim 1, wherein causing the processor to lock the capability includes causing the processor to:
  determine one or more capabilities of the subsequent stage; and
  select the capability of the computing device to be locked based on the determined one or more capabilities.

11. The computing device of claim 1, further comprising:
  one or more capability bits configured to enable or disable the capability, wherein the initiation software causing the processor to lock the capability of the computing device includes preventing the one or more capability bits from being changed.

12. The computing device of claim 1, wherein the initiation software causing the processor to lock the capability of the computing device includes performing a software patch of a following stage of boot code.

13. A non-transitory machine-readable medium having machine-executable instructions stored thereon, which when executed by a computing device cause the computing device to perform a method of locking a capability of a computer system, the method comprising:
  initiating a sequence of boot stages, each boot stage loading a stage of boot code from a storage medium;
  verifying a principal stage of boot code;
  executing the principal stage of boot code;
  verifying a subsequent stage of boot code, the subsequent stage of boot code including a set of configuration data;
  verifying a signature associated with the set of configuration data using a key of the principal stage; and
  if the subsequent stage of boot code cannot be verified, locking a capability of the computing device so that the subsequent stage of boot code cannot modify the capability wherein locking the capability includes preventing the subsequent stage from adding to, or changing, hardware or system level features of the computing device.

14. The non-transitory machine-readable medium of claim 13, wherein the verifying of the subsequent stage is performed by executing the principal stage of boot code.

15. The non-transitory machine-readable medium of claim 13, wherein locking the capability of the computing device includes performing a software patch of the subsequent stage of boot code.

16. The non-transitory machine-readable medium of claim 13, wherein the capability of the computing device is a hardware capability.

17. The non-transitory machine-readable medium of claim 13, wherein the capability of the computing device is a software capability.

18. The non-transitory machine-readable medium of claim 15, wherein fixing the software capability includes designating an executable portion of code that cannot be replaced or altered by a later stage of boot code.

19. The non-transitory machine-readable medium of claim 13, wherein fixing the capability includes reassigning a memory address associated with the capability to a different memory address.

20. The non-transitory machine-readable medium of claim 13, wherein locking the capability includes marking a software component responsible for the capability as non-executable or non-readable.

21. The non-transitory machine-readable medium of claim 13, wherein locking the capability includes erasing from memory a decryption key associated with an encrypted software component responsible for the capability before the encrypted software component is decrypted.

22. The non-transitory machine-readable medium of claim 13, wherein locking the capability includes:
  determining one or more capabilities of the subsequent stage; and
  selecting the capability of the computing device to be locked based on the determined one or more capabilities.

23. The non-transitory machine-readable medium of claim 13, wherein fixing a capability of the computing device includes preventing a set of capability bits from being changed.

24. A computer-implemented method for preventing an unverified boot stage from modifying a hardware capability of a computer-enabled device, comprising:
  verifying a principle stage of boot code;
  executing, using a processor, the principle stage of boot code on the computer-enabled device to set a hardware device associated with the computer-enabled device to a default state;
  verifying a subsequent stage of boot code, the subsequent stage of boot code including a set of configuration data;
  verifying a signature associated with the set of configuration data using a key of the principal stage; and
  if the subsequent stage of boot code cannot be verified, preventing the subsequent stage of boot code from modifying the default state of the hardware device, wherein locking the capability includes preventing the subsequent stage from modifying hardware or system level features of the computing device.

25. The computer-implemented method of claim 24, wherein the default state is a disabled state of the hardware device.

* * * * *